United States Patent [19]

Abramson et al.

[11] 4,120,559
[45] Oct. 17, 1978

[54] METHOD OF ESTABLISHING SECRET INFORMATION

[75] Inventors: Nils Abramson; Hans Bjelkhagen, both of Stockholm, Sweden

[73] Assignee: AB ID-kort, Stockholm, Sweden

[21] Appl. No.: 726,735

[22] Filed: Sep. 27, 1976

[30] Foreign Application Priority Data

Oct. 1, 1975 [SE] Sweden .................................. 7511006

[51] Int. Cl.² ............................................. G03H 1/04
[52] U.S. Cl. ................................... 350/3.60; 356/109
[58] Field of Search ........................ 356/109; 350/3.5

[56] References Cited

U.S. PATENT DOCUMENTS

| | | | |
|---|---|---|---|
| 3,566,137 | 2/1971 | Lemmond | 350/3.5 X |
| 3,620,590 | 11/1971 | Barker | 350/3.5 |
| 3,644,014 | 2/1972 | Hirschberg | 350/3.5 |
| 3,761,155 | 9/1973 | Lo et al. | 350/3.5 |
| 3,798,620 | 3/1974 | Cosentino | 350/3.5 X |
| 3,802,758 | 4/1974 | Havener et al. | 350/3.5 |
| 3,924,924 | 12/1975 | Fukuhara | 350/3.5 |
| 3,934,461 | 1/1976 | Heflinger et al. | 356/109 X |
| 3,961,837 | 6/1976 | Bied-Charreton et al. | 350/3.5 |

FOREIGN PATENT DOCUMENTS 1,454,340  11/1976  United Kingdom ..................... 356/109

OTHER PUBLICATIONS

Magill et al., "Use of Complex Valued Spatial Filters . . . ", IBM Tech. Discl. Bull., vol. 14, No. 1, Jun. 1971, p. 131.
Abramson, "Sandwich Hologram Interferometry . . . ", Applied Optics, vol. 13, No. 9, Sep. 1974, pp. 2019-2025.
Abramson, "Sandwich Hologram Interferometry 2 . . . ", Applied Optics, vol. 14, No. 4, Apr. 1975, pp. 981-984.
Abramson, "Sandwich Hologram Interferometry 3 . . . ", Applied Optics, vol. 15, No. 1, Jan. 1976, pp. 200-205.

*Primary Examiner*—John K. Corbin
*Assistant Examiner*—John D. Lee
*Attorney, Agent, or Firm*—Wegner, Stellman, McCord, Wiles & Wood

[57] ABSTRACT

A method for establishing and reading secret information using holographic interference pattern techniques. A holographic plate is placed in a holder and exposed with a laser light reflected from an object and a reference laser light to create a hologram. The exposed hologram is removed and a second holographic plate is inserted into the holder. The object, which may be a matrix, is selectively deformed to provide letters or numbers in accordance with the secret information to be established. The second holographic plate is then exposed with a light reflected from the deformed object and with the reference laser light to create a second hologram. The information contained on each hologram, when viewed individually, appears to be substantially identical. However, when the two holograms are later combined and illuminated, the secret information in the form of a holographic interference pattern will be observed in the hologram.

18 Claims, 1 Drawing Figure

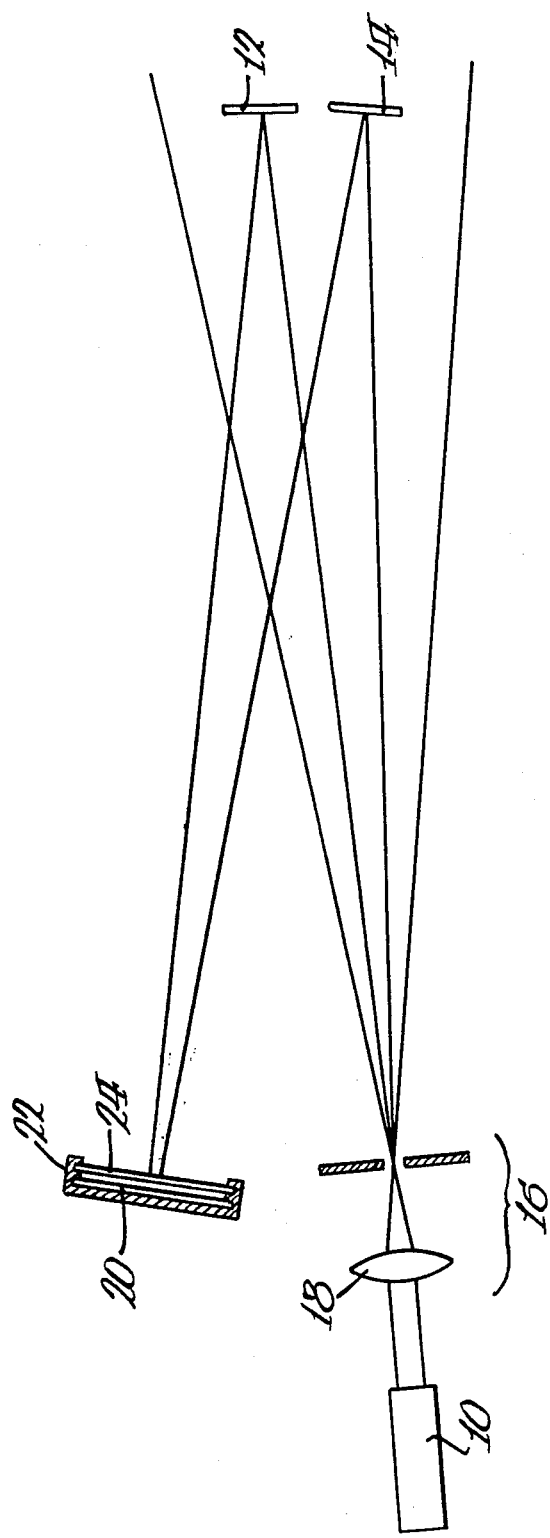

METHOD OF ESTABLISHING SECRET INFORMATION

This invention relates to the transmission of secret information and, more particularly, to the transmission of secret information by employing holographic techniques.

Secret information deposited on an information carrier, such as an identification card, credit card, license or certificate, is enjoying increased use. The information carrier must have the following characteristics:
(1) It must be difficult to falsify.
(2) The secret information on the information carrier should be readable only by an authorized receiver.
(3) The reading from the information carrier should be adaptable to automation.
(4) The capacity of the information carrier should be sufficiently high.

A number of methods for transmitting secret information by information carriers have been proposed. These methods include, for example, information carriers made of material which is difficult to procure (bank note paper), information carriers which are constructed so that the carrier is difficult to copy (bank note paper, watermarks), marking the information carrier by means of filaments inserted in the paper, marking the information by isotopes, etc.

In addition to the above, various methods of utilizing codes which are difficult to decipher have been employed. For example, the codes can be constructed from combinations of colors, figures and letters. The information can be arranged in such form that it is readable only by the use of special devices.

Also, printed texts or pictures, for example, can be optically distorted so that the picture becomes entirely unreadable unless a corresponding system is employed to restore the picture to its original state. These techniques involve moire methods, fiber optics and distorting windows, mirrors or lenses.

Other methods have been published concerning the utilization of holographic techniques for similar purposes. Well-known holographic methods will now be described in general, as will the holographic method of the present invention.

Generally, a hologram is produced in the following manner. A light source of sufficient coherence, such as a laser, is made to impinge upon a lens. A spatial filter is positioned at the focal point of the lens and the divergent light from the spatial filter illuminates the object to be photographed. Light reflected from the object is made to impinge upon a photographic emulsion, which is usually applied to a base consisting of glass or plastic film.

During the exposure, the holographic plate must also be provided with an additional light, hereinafter referred to as a reference beam, from preferably the same laser source. The reference beam may be established by dividing the original laser beam into several beams by means of any known optical method (for example, a conventional mirror or a semitranslucent mirror). The holographic plate is exposed by the laser light for a certain period of time. Thereafter the plate is developed in any known manner.

Thereafter, when laser light is projected onto the hologram from about the same direction and at approximately the same divergence as used during exposure, an image of the object is obtained. If the laser light is projected onto the hologram in the same direction as during exposure, the holographic image is virtual in that it can be seen only by viewing the hologram. The virtual image has a full three-dimensional effect and displays parallax (i.e., the object can be observed from different directions). However, if the light is projected through the hologram in a reverse direction, a real image is obtained which can be projected onto a screen. If, during exposure of the hologram, light is projected upon the holographic plate through a lens, the holographic image, when reconstructed, will lie on the plane of the holographic plate. Reconstruction may be accomplished by the use of ambient light as, for example, from a light bulb. If lenses and/or mirrors are used during exposure or reconstruction, an image of suitable size can be produced and can be focused at a suitable distance from the plate.

It should be noted that an important requirement in producing a hologram is that the spatial filter, the object, the reference mirror and the plate must remain stationary with respect to each other during exposure of the holographic plate. If the stationary relationship is not maintained, the interference pattern arising from the meeting of the object beam and the reference beam at the holographic plate may be obliterated. Also, it is important that the holographic plate have sufficient resolution in order that the interference pattern is capable of being reproduced.

Holographic interferometry makes it possible to measure deformations of an object in the order of 0.3 thousandth of a millimeter, even on large objects. One method for measuring minute deformations is by double exposure, wherein the hologram is produced in the manner described above, but the object is reproduced twice on the same holographic plate. When a point on the object moves a distance $d$ from one exposure to the next, it will appear black during reconstruction of the hologram. The formula for the distance is $$d = (\lambda/4)(2+n) \qquad \text{Equation 1}$$

where $\lambda$ is the wavelength of the laser light having a wavelength of approximately 0.5 thousandth of a millimeter and $n$ is zero or a selected integer.

If the object is deformed between the taking of the two exposures, a complicated interference pattern is obtained where the black lines satisfy Equation 1, where $d$ is the size of the deformation. Equation 1 applies only to the case where the deformation, lighting and observation of the hologram are perpendicular to the surface of the object.

The method described above is well known, and is applied when deformation, vibration, dimension changes and changes of the optical refractive index are to be precisely measured by holographic techniques.

Sandwich holography is a term employed to describe a method of holographic interferometry. This method requires that several exposures be made of the object. Each exposure represents a single deformation of the object. The exposures can be assembled in pairs, whereby interference patterns arise which show the difference in deformation of the object which has taken place between the two exposures. The two plates may be secured to each other by gluing one in front of the other, and the resulting "sandwich" hologram may be reconstructed by the same methods as discussed above. The described method of sandwich hologram interferometry is now well known and has been published in several articles which describe its use in acquiring accurate measurements of the deformed object.

When reconstructing the sandwich holographic image, it is important that the reconstruction beam be substantially identical with the reference beam which created the hologram. This can be easily achieved when the reference beam is in the form of a spherical wave, as is the case when, for example, the beam is obtained by positioning a plane mirror near the object. However, if the reference beam is complex, as for example that created by a ground glass plate placed in the beam's path, the holographic image of the object can be reconstructed only when a similar ground glass plate is placed in the path of the reconstruction beam.

This method has been discussed in the literature as being applicable to information coding. However, one must have access to the ground glass plate (or its photographic copy, which must reconstruct the microstructure of the glass down to about $5 \times 10^{-4}$ mm with high accuracy) in order to reacquire or reconstruct the information. The primary disadvantage of this method is that the ground glass plate must have exactly the same position relative to the holographic plate and reconstruction beam as the ground glass plate had at the exposure of the hologram in its relation to the holographic plate and the reference beam. This method requires high stability in both the exposure and the reconstruction apparatus.

A further disadvantage of this method is that a real image cannot be simply projected onto a screen by directing a laser beam through the hologram as discussed above. To accomplish this, more complex optics involving one or more lenses is required.

The present invention eliminates the above disadvantages and provides a new method for establishing and transmitting coded information.

The FIGURE is a schematic representation of the apparatus employed to expose holographic plates employed in the present invention.

A coded object is utilized in conjunction with holography to provide a carrier of secret information. The information is stored on two different holograms, both of which reproduce substantially the same coded object. However, the image of the object on one plate is controllably deformed in relation to the image of the undeformed object on the other plate. When the two holograms are positioned side by side to form a combined hologram, an image of the object representing the secret information transferred is obtained as a result of the interference patterns created. No individual hologram contains the information regarding the deformation of the object. Rather, two holograms must be combined to form one composite hologram for rendering it possible to read the secret information.

This method has the advantage that the two holographic plates can be combined simply by placing them adjacent each other, one in front of the other, in a girder having support pins. Thus, the reading apparatus at the location where the composite hologram is to be reconstructed can be compactly designed.

A further advantage, which also contributes to the compact design, is the ability of reconstructing the assembled hologram by projecting a direct laser beam therethrough to create a real image on a screen without requiring a lens system. In such case it is important to accurately position the two holograms, but experiments have shown that this is possible by means of simple, fixed support points.

In accordance with the present invention, it is also possible to use more than two holographic plates if it is desired to increase the degress of secrecy.

The deformable object must be designed so that its surface can be changed in localized areas so as to produce one or more interference lines on the image reconstructed from the assembled hologram. These localized changes must result in a change of the optical path length for the light beam emitted from the laser source and reflected from the surface of the object (coded surface). The change must be sufficiently great so as to give rise to one or more distinct interference lines. The difference in the path length must be at least of the magnitude of $0.5\lambda$, where $\lambda$ is the wavelength of the laser light. The change of the traveling path of light can be brought about by deforming or dislocating localized areas of the coded surface or by placing selected optical components (whose refractive index or the optical traveling path can be changed) in the path of the light. Therefore, it is apparent that either the coded surface itself or the image of the coded surface must be deformed.

In an effort to further explain the present invention, the following examples will be given. Assume that the coded surface includes a plurality of piezoelectric discs arranged in a matrix pattern which, by suitable activation (as, for example, the depression of keys), can form pictures, drawings, figures, letters, codes, lines, points and other signs. By depressing a key marked "A," the electrical signals emitted to the coded surface by way of the keyboard (or its logic control unit) cause the piezoelectric discs to be activated and thereby deformed in the pattern of an "A." Upon such activation, the voltage applied to the discs causes them to either increase or decrease in thickness so that the traveling path of light is changed so much that one or more interference lines arises in a reconstructed holographic image.

Exposing the holographic plates can be accomplished as follows. The first plate is exposed which, when reconstructed, will display the matrix of the piezoelectric discs in their nonactivated condition. Thereafter, when selected discs are activated, thereby increasing the thickness of certain discs, a second holographic plate is exposed in the same holder as the first. The plates are then developed.

When the plates are reconstructed one at a time at a remote location, no effect of the activated discs is observed, but when two holographic plates are combined, the selected image of the pattern of the activated discs appears. By choosing the method of deforming the matrix and reconstructing the holograms, the piezoelectric discs which have been activated can appear either as a dark spot against a light background or as a light spot against a dark background, or are covered by an arbitrary interference pattern.

It is not essential that only one holographic plate record the nonactivated coded surface or matrix and the other record the activated one. What is essential, however, is that the activation of a definite pattern result between the exposure of the two holographic plates.

As indicated above, in lieu of the local dislocation of the coded surface, optical components placed in the path of the light beam can be used to change the refractive index or the optical traveling path of the light beam. Examples of such components include Kerr cells, Pockel cells and gas or liquid cells, the pressure, temperature and composition of which can be varied.

By changing these components between the exposure of the different holographic plates, the traveling path of the light is changed and thereby an interference line results in the reconstructed holographic image.

The light-sensitive layer on the holographic plate can consist of a photoemulsion, a photoresist or light-sensitive material which may be applied on a base of glass, plastic or other preferably transparent material.

During the exposure of the hologram and for reconstructing it at a remote location, a guide is required. The guide can guide either the holographic plate itself or the medium to which it is attached. The light-sensitive material is required to have a sufficiently high resolution to be capable of reconstructing lines spaced apart from each other by a distance $d$.

$$d = \lambda/2 \sin\alpha \qquad \text{Equation 2}$$

where $\lambda$ is the wavelength of the laser light and $2\alpha$ is the largest angle between the object beam and the reference beam.

The hologram can be exposed on the holographic plate in the form of density variations (amplitude-hologram) or variations in the thickness or refractive index of the holographic plate (phase hologram). The holographic plates may be protected from the environment by providing a suitable cover such as a baked-on plastic protective layer. The protective layer should be of high optical quality. This is of particular importance for the material which lies between the two light-sensitive layers of the holographic plates during reconstruction. It would, however, be advantageous if the surfaces which abut each other during reconstruction would consist of an unprotected base material of the plates themselves.

One method of producing holograms in accordance with the present invention is to project light from laser 10 onto the object or matrix 12 and onto a mirror 14 placed adjacent thereto, as shown in the FIGURE. The laser light may be projected through a spatial filter 16 and lens 18. The object or matrix which has a dull, preferably white surface, reflects diffused light (the object beam) against the holographic plate while the mirror reflects the direct beam (the reference beam) against the holographic plate. At all points on the surface of the holographic plate where the object beam and the reference beam meet, a very dense interference pattern is formed. The distance between the lines ($d$) satisfies Equation 2.

Prior to exposing the first hologram 20, it must be placed in a holder 22 which has accurate positioning means. For example, the positioning means may be two support pins which align the long side of a rectangular plate and one support pin which aligns the short side thereof. Additionally, three support pins must be provided to determine the position of the surface of the holographic plate. The light-sensitive layer of the holographic plate 20 can face toward or from the object 12. In front of the holographic plate, a glass plate 24 is positioned which, during reconstruction, corresponds to the second holographic plate. This glass plate renders the conditions during exposure both mechanically and optically equal.

After exposure, the holographic plate 20 is removed from the holder and another plate is positioned in the place of glass plate 24. The glass plate 24 is placed behind the holographic plate. After the object 12 (matrix) has been selectively deformed, the second holographic plate is exposed, and both plates are ready to be developed.

During reconstruction at a remote location, the plate which was exposed behind the glass plate is placed behind the plate which was exposed in front of the glass plate. If no glass plates are used, additional interference patterns are obtained during reconstruction, rendering the reading of the object more difficult.

It is important to note that the travel path for light from the laser to the holographic plate by way of the object or the reference mirror cannot vary during the exposure by more than $0.125\lambda$. This can be achieved by designing stable equipment, placing it on a suitable vibration-free base, and fixing the reference mirror directly to the object and/or setting a very short exposure time. Short exposure times are available from ruby laser light sources which are Q-switched.

The laser light may be divided into a reference beam and an object beam by a semitranslucent mirror and a spatial filter in lieu of the reference mirror adjacent the object. Also, the holographic plates can be exposed without a spatial filter, but the quality is diminished. In order to reduce the requirements of the coherent light during reconstruction, the travel paths of light from the laser to the holographic plates by way of the object and reference mirror should be substantially equal.

To reduce the need for accuracy of positioning the holographic plates with respect to each other, one or more of the following steps can be taken while exposing the holographic plates. The greatest angle between the object beam and the reference beam should be made as small as possible.

The code surface or matrix is illuminated or observed at an oblique angle.

The reference light source is collimated. Also, a lens can be placed between the object and the holographic plate in such a manner that the object lies at the focal point of the lens (Fourier-hologram).

In addition, the reference beam may be diverged so that it would appear to be emitted from a point located at the same distance from the holographic plate as the object (lensless Fourier-hologram).

Lenses can be utilized in the object and the reference beam path to enlarge, reduce or focus the image onto a suitable plane. When, for example, the object is reconstructed on the holographic plate, a hologram (focused image hologram) is obtained which can be reconstructed by incoherent light, from a light bulb, for example.

The reference beam can be directed onto the holographic plate at a surface opposite that which the object beam impinges.

The information produced by the above methods can be used in the following manner. One holographic plate or its copy is located at a remote point where the secret information is to be read as, for example, in a bank. The other holographic plate is in the possession of the person delivering the information as, for example, a bank customer. When the secret information is to be read, the customer's holographic plate is placed above or in front of the bank's holographic plate (or vice versa), whereafter the object is reconstructed simply by directing a laser beam through the two plates. An image of the secret information is projected onto a screen in the vicinity of the plates. For accurate reading, it is important that the two plates be positioned correctly. The information can be read ocularly in the form of a virtual or a real image, or may be scanned by light-sensitive detectors such as photodiodes, diode matrices, or the like. The lens system also can be used for reducing or enlarging the image. In other embodiments, the reconstructed beam may be divergent, convergent or deviate in another way from a parallel pencil of rays. Also, the reference beam can be coded by having been passed through a ground plate lens.

The secret information can be used for transmitting secret messages in the following manner. At first one hologram is transmitted. After it has arrived, the second hologram is transmitted. When the two holograms have been assembled to form a composite hologram, the secret information can be read.

When the teachings of this invention are applied to an identification card, one and the same composite hologram can be used in the following ways, which are listed in the order of an increasing degree of secrecy. It is assumed that the holographic plate occupies a small window on the identification card which in other respects is conventional:

(a) The card is read in a usual manner without using the composite hologram.
(b) The hologram on the card is read by means of a laser to determine signs or pictures between the cards. It is much more difficult to falsify holograms than to falsify conventional identification cards. The reading of the identification card can be done manually or by an automatic reader having photodiodes. Access to the information is somewhat restricted since the general public does not have the use of a laser.
(c) The hologram is combined with the bank's hologram to form a composite hologram for the reading of secret information which cannot be read without access to the bank's hologram. Moreover, it is impossible to falsify the information without access to the coded surface used to expose both holographic plates. The reading can be done manually or automatically.
(d) The positions of the two holographic plates relative to each other can be selectively changed. The movement in the X and Y directions, as well as rotation, may be used to acquire definite values to recover the information.

What we claim is:

1. A method of establishing and reading secret information in the form of a holographic interference pattern comprising:
    exposing a first holographic plate with laser light reflected from an object and with a reference laser light to form a first hologram;
    deforming the laser light reflected from the object in accordance with the secret information to be established;
    exposing a second holographic plate with the deformed laser light reflected from the object and with the reference laser light to form a second hologram;
    maintaining the first hologram separate from the second hologram to keep secret the secret information;
    combining the first and second holograms by spacing the first and second holograms apart from each other by a predetermined distance; and
    simultaneously illuminating the first and second holograms with a laser light for observing the secret information.

2. The method as claimed in claim 1 wherein the step of deforming the laser light reflected from the object includes:
    deforming the object in accordance with the secret information to be established.

3. The method as claimed in claim 2 wherein the object is a matrix in which selective parts of the matrix may be deformed to provide various patterns including pictures, drawings, figures, letters, lines or points.

4. The method as claimed in claim 3 wherein the matrix is deformed by electric means.

5. The method as claimed in claim 3 wherein the matrix includes a plurality of piezo-electric discs, the thickness of which may be varied by the application of an electric potential to selectively deform the matrix.

6. The method as claimed in claim 1 wherein the step of deforming the laser light reflected from the object includes:
    changing the path length of the laser light reflected from the object by at least $0.5 \lambda (1+2N)$, where $\lambda$ is the wavelength of laser light and $N$ is either zero or a positive integer.

7. The method as claimed in claim 1 wherein the step of combining the first and second holograms includes spacing the holograms apart from each other by a predetermined distance.

8. The method as claimed in claim 1 wherein the step of deforming is provided by optical components which change the phase of the laser light impinging upon the second holographic plate, such optical components selected from the group consisting of Kerr-cells, Pockel-cells, gas or liquid cells adapted to change the phase of the laser light in accordance with pressure or temperature changes.

9. The method as claimed in claim 1 wherein the step of exposing includes: minimizing the angle between the laser light reflected from the object and the reference laser light.

10. The method as claimed in claim 1 wherein the reference laser light is collimated.

11. The method as claimed in claim 10 wherein the light reflected from the object is collimated.

12. The method as claimed in claim 11 further including prior to the step of exposing the second holographic plate: disposing a lens between the object and the second holographic plate so that the object lies at the focal point of the lens.

13. The method as claimed in claim 1 further including prior to the step of exposing:
    impinging the reference laser light on a surface of the second holographic plate; and
    impinging the laser light reflected from the object on the opposite surface thereof.

14. The method as claimed in claim 1 further including prior to the step of exposing:
    placing a glass plate in front of the first holographic plate in a holder; and
    placing another glass plate behind the second holographic plate.

15. The method as claimed in claim 1 further including the step of: displacing the first hologram with respect to the second hologram for improving the observation of the secret information.

16. The method as claimed in claim 1 further including the step of: inclining the first hologram with respect to the second hologram for improving the observation of the secret information.

17. The method as claimed in claim 1 further including, prior to the step of exposing the first holographic plate and the second holographic plate:
    placing the first holographic plate and the second holographic plate, respectively, in a holder.

18. The method as claimed in claim 1 wherein the step of combining the first and the second holograms includes:
    placing one in front of the other at a remote location.

* * * * *